United States Patent [19]

Bulluck

[11] Patent Number: 5,070,138

[45] Date of Patent: Dec. 3, 1991

[54] POLYURETHANE ELASTOMER TIRE FILL COMPOSITIONS AND METHOD OF MAKING SAME

[75] Inventor: John W. Bulluck, Richmond, Va.

[73] Assignee: E. R. Carpenter Company, Inc., Richmond, Va.

[21] Appl. No.: 552,408

[22] Filed: Jul. 13, 1990

[51] Int. Cl.$^5$ ............................................. C08L 75/04
[52] U.S. Cl. ..................................... 524/871; 528/48; 528/76; 152/310
[58] Field of Search ................... 524/871; 528/48, 76; 152/310

[56] References Cited

U.S. PATENT DOCUMENTS 4,081,429  3/1978  Alberino et al. ....................... 528/48

*Primary Examiner*—Maurice J. Welsh
*Attorney, Agent, or Firm*—Beveridge, DeGrandi & Weilacher

[57] ABSTRACT

A method for making a polyurethane elastomer tire fill composition wherein a mixture of a) a low functionality (2.0–2.3) 4,4'-diphenylmethane diisocyanate, such as a carboiimide-modified (2.0 functionality) 4,4'-diphenylmethane diisocyanate and b) a nonreactive diluent, such as an oil extender, is mixed with a polyol, such as polypropylene oxide triol. The reaction mixture is inserted into a tire casing under pressure and cured therein to form an essentially void-free tire filler. The tire fill composition maintains pressure within the tire during use and has excellent physical and thermal properties. No prepolymer step is necessary in the method.

7 Claims, No Drawings

POLYURETHANE ELASTOMER TIRE FILL COMPOSITIONS AND METHOD OF MAKING SAME

This invention relates to a new and novel method for making a polyurethane elastomer composition having excellent physical and thermal properties and suitable for use in completely filling tires and permitting such tires to be used on all types of vehicles without the tires becoming flat, especially during use over rugged terrain, and also relates to the polyurethane elastomer composition, per se.

BACKGROUND OF THE INVENTION

The principal drawback with air-filled vehicle tires, such as tires used on automobiles, trucks, tires, aircraft, fork-lift, trucks, tractors, etc. is that when the tire is punctured by a sharp object, it promptly loses air and goes flat. This necessitates having to change the tire. If the flat occurs late at night on an infrequently travelled road, the driver may experience difficulty in obtaining assistance to change the tire and replace it with a spare. If the flat occurs as a fork-lift truck is carrying a heavy load, the consequences can be a disaster.

The art has long sought to make vehicle tires with a solid filler in lieu of air so as to avoid having the tires go flat due to loss of air when punctured. The use of elastomeric fillings, including polyurethane fillings for tires wherein the filling is used in place of the air under pressure is known. Such tires are usually placed on heavy duty vehicles used in rugged terrains, including mining vehicles, construction equipment, land-clearing equipment, farm equipment, scrap yard vehicles and vehicles for off-road applications, etc. where the vehicles are constantly driven over rocks and debris.

U.S. Pat. No. 3,022,810 discloses the formation of a rubber-like closed-cell resilient polyurethane foam of substantially uniform density within a tire casing. U.S. Pat. No. 3,112,785 also discloses in situ forming of a polyurethane foam in a tire casing, which foam does not adhere to the inner wall of the casing and the adding of a liquid antifreeze solution into the tire to be dispersed into the cellular structure. U.S. Pat. No. 3,381,735 forms a synthetic rubber filler within the tire and then vulcanizes the filler. U.S. patent No. 3,605,848 describes a tire filled with a microcellular polyurethane core wherein water is utilized as the blowing agent and chain extender. Upon reaction of the water with the isocyanate, carbon dioxide is formed which results in the foaming of the polyurethane reaction mixture.

As a tire rotates on a vehicle wheel, it is cyclically compressed at a rate dependent upon the vehicle speed. Due to internal friction, or hysteresis, in the filler material, heat builds up in the material. Noncyclical distortions due to uneven terrain and turning of the vehicle also cause heat buildup in like manner. The ultimate temperature reached in the tire depends on the heat generated by hysteresis and on the thermal conductivity of the filler which causes heat to flow out of the filler, as well as on ambient temperatures and tire size. Degradation of the filler material under elevated temperature conditions and mechanical strain cause the breaking of the chemical bonds in the material, thereby weakening it and allowing the material when stressed to exhibit different elastic behavior. The major drawback with tires filled with polyurethane foam has been that they are readily flexed, thus causing excessive heat build-up within the tire as it is driven, causing filler breakdown, casing damage, etc. due to poor heat transfer. This high temperature degrades the rubber tire sheath within a short period of time.

U.S. Pat. No. 3,866,651 which was reissued as RE. 29,890, discloses the use of a void-free elastomeric polyurethane in a tire casing which overcomes some of the problems of polyurethane foam fillers described above. The patentee produces his elastomeric polyurethane material in situ within the tire casing in the essential absence of foam producing materials, i.e. blowing agents, in the reaction zone. In order to avoid formation of any pores in the polyurethane, stringent moisture-free conditions are required. The resulting filler imparts less deflection to the tire than does a foam filler, such that improved heat build-up characteristics are obtained. However, the drawback in using this essentially void-free polyurethane elastomeric material is the resultant very high cost of filling a tire. Attempts to reduce such costs by diluting the filler material with extender oil results in a sharp decrease in the hardness of the filler.

U.S. Pat. No. 4,416,844 discloses a method for making an essentially void-free polyurethane tire fill composition having extender oil as part of the composition while maintaining a Durometer hardness of at least 20 on the A scale for such composition. The patentee adds water as a reactant to produce carbon dioxide in the reaction zone, e.g. in the tire, and cures the elastomer under conditions whereby the carbon dioxide is dissolved in the elastomer. A pressure of at least 25 psi is required to prevent bubble formation in the tire. As a result of the water reaction, a polyurea-containing polyurethane elastomer is obtained having good hardness characteristics. The patentee states that while a polyurea-containing elastomer generally has less oil compatability on a weight basis than an all-urethane containing elastomer, because of its very high Durometer hardness, such polyurea-containing elastomer has higher oil compatability for a particular level of Durometer hardness. Whereas urethane systems can be oil-extended at a useful hardness level, the level of oil extension is limited by large decreases in hardness. However, elastomer prepared in accordance with the invention of U.S. Pat. No. 4,416,844 can be extended by as much as fifty weight percent with oil and still yield a Durometer hardness of 30 and, for lower hardness levels, up to sixty weight percent oil can be added without bleeding from the elastomer at room temperature. In each of the examples in U.S. Pat. No. 4,416,844 an isocyanate-polyol precursor was reacted with a polyol to form the polyurethane elastomer tire filling. In fact, all of the disclosures in the aforementioned patents use either a prepolymer in the isocyanate component or precursor or allude to the mixing of all of the reactants together and subsequently injecting the reaction mixture into the tire casing and curing it therein. All of the reaction processes in the foregoing patents also include the use of a catalyst for the reaction.

SUMMARY OF THE INVENTION

Applicant has discovered a method for forming an essentially void-free polyurethane elastomer suitable for use as a tire fill and having excellent physical and thermal properties. Applicant's method utilizes the reaction of an isocyanate precursor with a polyol precursor to form the polyurethane wherein the isocyanate precursor is a mixture of a low functionality 4,4'-diphenylmethane diisocyanate and a non-reactive diluent or extender oil. Carbodiimide-modified 4,4'-diphenylmethane diisocyanate is the preferred component in producing polyurethane tire fill elastomers with greatly improved thermal properties. Other low functionality modified 4,4'-diphenylmethane diisocyanates suitable for purposes of this invention and having a functionality of about 2.0 to 2.3 are commercially available. The functionality of the diisocyanate useful in this invention is about 2.0–2.3. The step of first forming a prepolymer with an isocyanate and polyol and then reacting the prepolymer with the polyol has been eliminated from applicant's process.

Because of the high reactivity of the low functionality (2.0–2.3) 4,4'-diphenylmethane diisocyanate, and the elimination of the prepolymer formation in the isocyanate component very little or no catalyst is needed in the process, resulting in an unexpected increase in thermal stability for the final product. The low functionality 4,4'-diphenylmethane diisocyanate based system of the present invention also has a much lower vapor pressure than the 2,4-toluene diisocyanate state-of-the-art prepolymer-based tire fill systems such that a lower concentration of harmful diisocyanate vapors are present. The higher functionality polymeric diphenylmethane diisocyanates, on the other hand, (i.e. higher than about 2.3) produce tire fill compounds with inferior physical properties, including poor elastomeric properties. The lower functionality (2.0–2.3) 4,4'-diphenylmethane diisocyanate shows superior compatibility with the extender oil in neat films. Such increased compatibility is evidenced by a decrease in cloudiness of the cured film and an increase in physical properties. Tires made with the tire fill polyurethanes of the present invention have been successfully tested without failure of the tire or the material.

Accordingly it is an object of this invention to make a polyurethane oil-extended tire fill elastomer having improved thermal stability properties as compared to commercially available polyurethane tire fill elastomers and suitable for use in tires without failure of the elastomer or tire casing.

It is a further object of this invention to make a polyurethane oil-extended tire fill elastomer for tires wherein no prepolymer formation is necessary in the process, little or no catalyst is used, and such elastomer has superior thermal stability due to its aromatic polyurea urethane backbone structure and the reduced amount of catalyst needed for its formation.

DETAILED DESCRIPTION OF THE INVENTION

A typical polyurethane elastomer is produced by the reaction of two components, an A component containing the isocyanate and a B component, usually a polyol containing the hydrogen donor. Tire fill polyurethane elastomers made in accordance with known prior art methods have used an isocyanate A component consisting of an isocyanate prepolymer. In the present invention, the A component consists essentially of a mixture of a low functionality (2.0–2.3) 4,4'-diphenylmethane diisocyante with a nonreactive diluent, such as an extender oil, adjusted to a specific % NCO such that a one-to-one volume mix with the B component can be obtained.

Of the low functionality 4,4'-diphenylmethane diisocyanates useful for this invention, the carbodiimide-modified 4,4'diphenylmethane (2.0 functional) is preferred over pure 4,4'-diphenylmethane diisocyanate because it is a liquid and facilitates the production of the A component mixture of diisocyate and non-reactive diluent. Use of the carbodiimide-modified 4,4'-diphenylmethane diisocyanate also results in improved low temperature storage of the A component. Such diisocyanate also has superior high temperature properties and is commercially available under the trademark Lupranate MM103 from the manufacturer, BASF Wyandotte Corporation.

The non-reactive diluents used in making the component A mixture of the invention with the low functionality 4,4'-diphenylmethane diisocyanate include a number of extender oils. These oils are complex distillates of crude oil and have a high percentage of aromatic content. Some may also contain polar compounds. A typical oil for use as a polyurethane extender is sold under the trademark Califlux LP by its manufacturer, Witco Corporation. It is reported that such extender oil has about 78 percent aromatics and 9 percent polar compounds with the remainder being saturates. The oil has a specific gravity at 6° F. of 0.9786 and API gravity of 13.1, a viscosity, SUS, at 100° F. of 169, a flash point COC of 320° F., and an aniline point of less than 59° F. Other useful oil extenders include those made and sold under the trademark Califlux Lao by Witco Corporation and viplex 530 from Crowley Chemical. All of the extender oil can be present in the A component but, if desired, a small portion of the extender oil can also be present in the B component, for purposes of this invention. The extender oil may be present in amounts from at least about 10% up to about 50% and even as high as 60% of the final reaction product.

The fact that no prepolymer is needed for the isocyanate/extender component is advantageous in that it keeps processing time (typically for prepolymer formation three hours are needed versus one hour maximum time to produce the A component of the system of the invention) to a minimum, and eliminates the expense of the additional polyol needed for prepolymer formation. Excellent physical properties for the cured elastomer are obtained using this invention over conventional 4,4'-diphenylmethane diisocyanate prepolymer systems.

The B component used in making a typical polyurethane is usually a polyol, such as a polyether polyol or a polyester polyol, containing hydrogen donors which react with the isocyanate in the A component. Typical chain extenders which can be used in the B component of the present invention include high molecular weight polyether polyols which are ethylene oxide capped. Such ethylene oxide capping of the polyether polyols is advantageous because of their higher reactivity since a lower catalyst level is required for the tire fill elastomer. A preferred polyether chain extender for making the tire fill polyurethane composition of the invention is a polypropylene oxide triol, with 15% ethylene oxide capping and having a molecular weight of about 6500, manufactured by Carpenter Chemical Corporation and sold under the trademark Carpol GP-6500. Other polyether polyols can also be used. Included are the polyoxyalkylene polyols having two to four hydroxyl groups and two to six carbon atoms in the alkylene group, obtained by reacting alkylene oxide, such as ethylene oxide or propylene oxide, with a glycol. Included among the commercially available polyols suitable for purposes of this invention are those sold under the trademark voranols by Dow Chemical Company, Poly-G by Olin Corporation, and Pluracols from BASF Wyandotte Corporation.

Depending on the polyurea containing characteristics sought in the final polyurethane elastomer, various levels of an aromatic or aliphatic diamine are added to the B component. The diamine reacts with the isocyanate of the A component to form urea linkages. Urea linkages impart a higher level of physical properties, thermal stability, and hardness than polyurethane linkages. In addition, the polyurea linkages serve to offset the decrease in hardness due to incorporation of a high level of extender in the tire fill compound. A preferred aromatic diamine for the chain extension reaction is meta-phenylene diamine, manufactured by Dupont and by First Chemical. The highly aromatic nature of this diamine with no pendant alkyl groups contributes to the thermal stability of the polyurethane tire fill elastomer. Other diamines which have been used in the present invention include toluene diamine, N,N-dialkyl phenylene diamine, and diethyltoluene diamine.

Water is added at a level below 0.20% parts by weight in the B component and preferably in an amount of at least about 1%. The water reacts with the isocyanate in the A component when the two components are mixed to produce a carbamic acid which is unstable and liberates carbon dioxide gas and forms an amine which subsequently undergoes reaction with the isocyanate to form urea linkages. The urea linkages impart a high level of physical properties, hardness, and thermoxidative stability to the polyurethane tire fill elastomer.

Surfactants may be utilized in the B component to reduce surface tension, assist in the release of any generated carbon dioxide, and improve flow. A preferred surfactant of the polysiloxane type is manufactured by Union Carbide Corporation and sold under the trademark UC Y-10,184. In addition, Troy Chemical Corporation polysiloxane surfactants sold under the trademarks Troysol LAC and Troysol S 366 can be used in making the composition of the invention. Other known polysiloxane surfactants manufactured by Union Carbide, Air Products Company, or Goldschmidt may also be used.

The remaining additives which may be present in the B component include an organometallic catalyst and an antioxidant. When present, the organometallic catalyst functions in numerous ways and catalyzes the hydrogen donor/isocyanate reaction. Such organometallic catalysts include bismuth, cobalt, mercury, potassium and tin organometallic compounds which are known in urethane chemistry. Dibuytin dilaurate is an extremely active and preferred organometallic catalyst for use in the process of the invention up to an amount of no more than about 0.05 parts by weight of the B component. However, no catalyst need be present. The mercaptide tin blocked catalyst such as Formrez UL 6 and UL 24 manufactured by Witco Corporation can also be used for this invention. Among the number of known antioxidants which can be used in the process of this invention, to prevent or retard the thermoxidative processes within the tire fill elastomer, butylated hydroxy toluene is preferred.

To prepare the isocyanate component, (A component), of the present invention, the warmed extender oil and the low functionality (2.0-2.3) 4,4'-diphenylmethane isocyanate are blended until a good mixture is obtained. It is suggested that an inert gas blanket be provided over the reaction mixture. After the mixture has agitated adequately, the mixture is filtered, dispensed into a drum, and an inert gas blanket is placed over the mixture and the drum is sealed. Argon and nitrogen are among the suitable inert gases which can be used for this purpose.

To prepare the polyol component (B component), of the present invention, the components are warmed and agitated. After a temperature of 140° F. has been reached, the solid diamine is added and the solution is continually agitated until solution is effected. Subsequently, all the mixed polyol components are drummed until ready for use in making the polyurethane elastomer tire fill composition of the invention, in accordance with the known methods for inserting the reaction mixture into a tire casing as disclosed in U.S. Pat. Nos. Re 29,890 and 4,416,844, which disclosures are incorporated herein by reference.

The liquid filling material reactants, component A and component B, are usually provided in two separate containers and then mixed just prior to being pumped into the tire casing under pressure, preferably through the valve stem of the tire. A small hole is punched through the tire, usually at a point opposite the valve stem to provide a gas escape outlet for the entrapped air being displaced by the liquid. When all entrapped air is displaced, the hole is sealed, usually by a screw, and the mixture of reactants continues to be pumped into the tire until the pressure to firmly secure the tire casing to the rim and prevent slippage is about the same pressure as if air had been used to secure the tire to the rim. After such full pressurization has been achieved, the liquid inlet to the tire is sealed and the polyurethane mixture within the tire is cured to its full hardness and is essentially void free. The tire is then ready for use.

The following examples further illustrate the present invention, but without limiting the invention thereto:

EXAMPLE 1

14.4 parts by weight of a carbodiimide modified 4,4'-diphenylmethane diisocyanate (Lupranate MM103) having a functionality of 2.0 was warmed to a temperature of about 95° F. and mixed with 85.6 parts by weight of Califlux LP extender oil in a container and thoroughly mixed for 10 minutes, using a stirrer. The solution was filtered, decanted into a container, argon gas was placed over the solution and the container was sealed. The percent NCO was determined to be 4.01% and the mixture is referred to as Component A.

The following ingredients in the parts by weight as indicated below were placed in a container, warmed to 140° F. and agitated and mixed with a laboratory mixer:

| Ingredient | Parts by Weight |
| --- | --- |
| Polypropylene oxide triol (Carpol GP-6500) | 84.80 |
| Dibutyltin dilaurate | 0.05 |
| Water | 0.11 |
| Butylated hydroxy toluene | 0.09 |
| Surfactant (UC Y-10,184) | 1.10 |
| Extender Oil (Califlux LP) | 12.11 |

To the warmed mixture was added 1.74 parts by weight of metaphenylene diamine and stirring was continued for ten minutes until complete solution was effected. This mixture is referred to as Component B.

A neat film was prepared from the reaction of a one-to-one by volume mix of Component A and Component B. The film had a thickness of approximately 20 mils and was cured for 16 hours at 75° F., 24 hours at 150° F. and 7 days at 75° F. The film had the following physical properties:

TABLE I

| Property | Value |
|---|---|
| Tensile strength (psi) | 160.8 |
| Tear Strength die c (pli) | 41.1 |
| Elongation | 355.3% |
| Shore A hardness | 22 |

A neat film of the invention made and cured in the same manner as above was placed in an air circulating oven and contained in a jar with an inert gas blanket at 300° F. for a period of 24 hours. The following physical properties of the film were measured:

TABLE II

| Property | Value |
|---|---|
| Tensile strength (psi) | 137.4 |
| Tear Strength die c (pli) | 34.8 |
| Elongation | 250% |
| Shore A hardness | 32 |

The tire fill composition of the invention made from A Component and B Component were tested and compared with three state-of-the-art tire fill prepolymer based systems, including two toluene diisocyanate systems from different manufacturers, namely, SynAir Tyrfil GS (U.S. Pat. No. Re. 29,890) and Arnco's RePneu (U.S. Pat. No. 4,416,844) and a 4,4'diphenylmethane diisocyanate prepolymer system, Marchem's Mistaflex. Tensile plaques of the three respective polyurethane tire fill materials and of the tire fill material of the invention were cured for 16 hours at 75° F., 24 hours at 150°F., and 7 hours at 75° F. and then were heated in closed containers with an inert gas blanket to a temperature of 300° F. for 24 hours. At the end of that time the tire fill elastomers were physically tested. The following properties were obtained by testing plaques prior to heat treatment and by testing plaques after being subjected to the heat treatment:

TABLE III

| System | Tensile | Tear | Elongation | *Tensile | *Tear | *Elongation |
|---|---|---|---|---|---|---|
| RePneu (TDI prepolymer) | 220 | 68 | 525 | Depolymerization | | |
| Tyrfil GS (TDI Prepolymer) | 270 | 137 | 760 | 21 | 9.0 | 43 |
| Mistaflex (MDI prepolymer) | 34 | 18 | 200 | 27 | 7.8 | 200 |
| Invention | 160 | 41 | 350 | 137 | 35 | 250 |

*After exposure to 300° F. for 24 hours in an inert environment.

TDI prepolymer refers to a prepolymer made with toluene diisocyanate. MDI prepolymer refers to a prepolymer made with 4,4'-diphenylmethane diisocyanate.

The composition of the invention made in accordance with Example 1 had approximately five times the tensile and tear strength of the prior art products after 24 hour heat aging at 300° F. This was due primarily to two factors, the low amount of catalyst needed in the method of the present invention and the thermal stability attributed to the low functionality (2.0) carbodiimide-modified 4,4' diphenylmethane diisocyanate. The excellent thermal stability of the tire fill elastomers of the applicant's invention means a longer life for the tire fill system.

EXAMPLE 2

The A component and the B component of Example 1 were mixed in a one-to-one by volume ratio and injected into a standard sized light truck tire (P235/75 R15), in the manner described above and known in the art, and cured therein. The tire was tested at 55 mph and 100% of rated load (2028 lbs.) for a period of 24 hours at a distance of 1,320 miles, without failure.

EXAMPLE 3

The A Component and the B component of Example 1 were mixed in a one-to-one by volume ratio and injected into truck tires (11R 22.5 Load Range G) and cured therein. The tires were initially run at 120% of rated load (7,410 lbs.) and at a speed of 20 mph, for a period of 24 hours and then run for an additional 11 hours at 30 mph and 120% of the rated load. There was no failure of the tires or the essentially void free fill material in the tires.

EXAMPLE 4

14.4 parts by weight of Lupranate MM103 (2.0 functional) was preheated according to the manufacturer's instructions and rolled to effect solution of the dimerized product and then was mixed in a reactor with 85.6 parts by weight of Califlux LP oil extender which was heated to a temperature of 95° F. and stirred for about 45 minutes under a nitrogen blanket. The mixture was drummed and an inert gas placed over the liquid prior to sealing. The mixture is referred to as the A component.

The following ingredients in parts by weight as indicated below were placed in a container and heated to a temperature of 145° F. while being stirred:

| Ingredients | Parts by Weight |
|---|---|
| Carpol GP-6500 | 84.73 |
| Dibutyltin dilaurate | 0.05 |
| UC Y-10,184 (surfactant) | 1.10 |
| Butylated hydroxy toluene | 0.09 |
| Califlux LP | 12.11 |
| Water | 0.18 |

To the stirred mixture was then added 1.74 parts by weight of meta-phenylene diamine and the stirring was continued for one hour. The mixture is referred to as the B component.

A neat film was prepared from a one-to-one by volume mix of the A component and the B component and the film was cured for 16 hours at 75° F., 24 hours at 150° F. and 7 days at 75° F. When tested the film gave the following physical properties:

TABLE IV

| Property | Value |
|---|---|
| Tensile strength (psi) | 218.9 |

TABLE IV-continued

| Property | Value |
|---|---|
| Tear strength die c (pli) | 57.5 |
| Elongation | 513.3 |
| Shore A hardness | 22 |

The difference in properties is believed due to the higher level of water used, which caused more urea linkages to be formed.

EXAMPLE 5

14.46 parts by weight of Lupranate MM103 was preheated and mixed with 85.54 parts by weight of Califlux LP oil extender to form the A component. The solution was drummed and an inert gas placed over the mixture before sealing.

The following ingredients in parts by weight as indicated below were placed in a container and heated to about 140° F. and agitated.

| Ingredients | Parts by Weight |
|---|---|
| Polypropylene oxide triol (Carpol GP-6500) | 84.84 |
| Oil Extender (Califlux LP) | 12.12 |
| Surfactant (UC Y-10,184) | 1.10 |
| Butylated hydroxy toluene | 0.09 |
| Water | 0.11 |

To the stirred mixture was added 1.74 parts by weight of metaphenylene diamine and the stirring continued for one hour. The mixture is the B component. An equal volume mix of the A and B components was made and a neat film was cast therefrom having a thickness of approximately 20 mils and was cured for 16 hours at 75° F., 24 hours at 150° F. and 7 days at 75° F.

The film was then tested for the physical properties set forth below:

TABLE V

| Property | Value |
|---|---|
| Tensile strength (psi) | 218.9 |
| Tear strength die c (pli) | 57.5 |
| Elongation | 513.3 |
| Shore A hardness | 22 |

The excellent physical properties were obtained without the use of any catalyst in the B Component.

I claim:

1. A method of making a polyurethane elastomer composition having excellent physical and thermal properties and suitable for use as a filling material for a vehicle tire, comprising reacting.
    a) a mixture of a low functionality 4,4'-diphenylmethane diisocyanate or a modified 4,4'-diphenylmethane diisocyanate and a nonreactive diluent, wherein said low functionality is from about 2 to about 2.3, and
    b) A mixture consisting essentially of
        hydroxyl group terminated polyfunctional polyether and
        added water in an amount of less than 0.2% by volume of said mixture b), and
    curing the reaction product which is formed.

2. The method of making the polyurethane elastomeric composition as defined in claim 1 wherein said nonreactive diluent is extender oil and said diisocyanate is carbodiimide modified 4,4'-diphenylmethane diisocyanate having a functionality of 2.0.

3. The method of making the polyurethane elastomeric composition of claim 1 or 2 wherein said polyether is polypropylene oxide triol.

4. The method of making the polyurethane elastomeric composition of claim 3 wherein said triol has about 15% ethylene oxide capping.

5. The method of making the polyurethane elastomeric composition of claim 1 or 2 wherein the reaction of mixture a) and mixture b) occurs in the presence of an aromatic or aliphatic amine present in an amount sufficient to react with said diisocyanate to form urea linkages in said elastomeric composition.

6. The polyurethane elastomeric composition having excellent physical and thermal properties and suitable for use as a filling material for a vehicle tire made in accordance with the method as defined in claims 1, 2, 3, 4 or 5.

7. A vehicle tire having its casing filled with the cured polyurethane elastomeric composition as defined in claim 6, said composition being under sufficient pressure within said casing to maintain said tire in operable condition for use on a vehicle, said polyurethane elastomeric composition within said casing having sufficient thermal stability to withstand the heat generated by the tire in use on a vehicle and not be adversely effected by such heat.

* * * * *